United States Patent [19]

Martens et al.

[11] Patent Number: 4,578,944
[45] Date of Patent: Apr. 1, 1986

[54] HEAT RECOVERY STEAM GENERATOR OUTLET TEMPERATURE CONTROL SYSTEM FOR A COMBINED CYCLE POWER PLANT

[75] Inventors: Alan Martens, Berwyn; Gerald A. Myers, Swarthmore; William L. McCarty, West Chester; Kermit R. Wescott, Kennett Square, all of Pa.

[73] Assignee: Westinghouse Electric Corp., Pittsburgh, Pa.

[21] Appl. No.: 664,644

[22] Filed: Oct. 25, 1984

[51] Int. Cl.$^4$ .............................. F02C 6/18
[52] U.S. Cl. .................... 60/39.182; 122/7 B
[58] Field of Search ............. 60/39.182; 122/7 R, 122/7 B, 479 R; 290/40 R

[56] References Cited

U.S. PATENT DOCUMENTS

| | | | |
|---|---|---|---|
| 2,594,818 | 4/1952 | Sprague et al. | 122/479 R |
| 3,183,897 | 5/1965 | De Livois | 122/479 R |
| 3,807,364 | 4/1974 | Schwartz | 122/7 R |
| 3,879,616 | 4/1975 | Baker et al. | 60/39.182 |
| 3,939,328 | 2/1976 | Davis | 235/150.1 |
| 3,948,043 | 4/1976 | Martz | 60/243 |
| 3,953,966 | 5/1976 | Martz et al. | 60/39.02 |
| 3,973,391 | 8/1976 | Reed et al. | 60/39.29 |
| 4,010,605 | 3/1977 | Uram | 60/39.14 |
| 4,031,404 | 6/1977 | Martz et al. | 290/40 R |
| 4,081,956 | 4/1978 | Baker et al. | 60/39.182 |
| 4,168,608 | 9/1979 | Uram | 60/39.03 |
| 4,184,324 | 1/1980 | Kiscaden et al. | 60/39.182 |
| 4,333,310 | 6/1982 | Uram | 60/39.182 |

Primary Examiner—Louis J. Casaregola
Attorney, Agent, or Firm—C. M. Lorin

[57] ABSTRACT

In a combined cycle plant boiler an inlet temperature is adjusted or controlled while concurrently modulating the IGV's and the load of the gas turbine and the attemperator of the boiler, and concurrent modulation of the IGV's, the gas turbine load, the attemperator is effected as upon three independent control variables to adjust and/or maintain the boiler outlet temperature independently of steam turbine operation and to maximize gas turbine load control range. Control of the output temperature of one boiler is also managed in relation with the mixed temperature of steam from other boilers fluidly connected to the steam turbines.

15 Claims, 16 Drawing Figures

HEAT RECOVERY STEAM GENERATOR OUTLET TEMPERATURE CONTROL SYSTEM FOR A COMBINED CYCLE POWER PLANT

BACKGROUND OF THE INVENTION

The present invention relates to steam temperature control of a combined cycle electric power plant, in general, and more particularly to combined and selective control of the gas turbine, afterburner and heat recovery steam generator so as to provide superheated steam for the steam turbine of a combined cycle electric power plant under predetermined steam flow, pressure and temperature operative conditions.

U.S. Pat. No. 3,973,391 (Reed and Smith) shows automatic and manual control of the inlet guide vane control apparatus of a gas turbine for modulated control as a function of load or inlet blade path temperature, in a combined cycle electric power plant. For the purpose of this description, U.S. Pat. No. 3,973,391 is hereby incorporated by reference.

U.S. Pat. No. 4010,605 (Uram) discloses a gas turbine control system in a combined cycle electrical power plant as part of an automatic start-up speed control involving fuel reference as a function of time. This patent refers to operation at a coordinated control level in which the settings of the fuel valves, the inlet guide vanes of the gas turbine and of the steam turbine throttle and bypass valves are coordinated to provide maximum plant efficiency at a given load level and optimum performance during load changing conditions. This patent is hereby incorporated by reference for the purpose of the present description of the invention.

U.S. Pat. No. 3,953,966 (Martz and Plotnick) shows a combined cycle electrical plant in which the heat supply from the gas turbine is reduced by placing a reduced load control signal thereon and by terminating the flow of fuel to the afterburner, whereby dry steam is recovered from the associated heat recovery steam generator. For the purpose of describing control of the gas turbine and afterburner in relation to the production of steam, U.S. Pat. No. 3,953,966 is hereby incorporated by reference.

U.S. Pat. No. 4,333,310 (Uram) discloses a combined cycle electrical power plant in which the afterburner is controlled as a function of the gas turbine exhaust temperature within a coordinated plant control for optimization of the afterburner operation. The U.S. Pat. No. 4,333,310 is incorporated by reference, in particular because it discloses the generation of afterburner setpoints in a coordinated mode of control with the heat recovery steam generator associated thereto.

U.S. Pat. No. 4,031,404 (Martz and Plotnick) discloses control of the gas turbine exhaust gas temperature to control the generated superheated steam temperature and pressure. The temperature of the gas turbine exhaust gases is sensed and the afterburner fuel supply valve is positioned in accordance wtih such sensed temperature to regulate the superheated steam temperature. The U.S. Pat. No. 4,031,404 is hereby incorporated by reference, thereby to include gas turbine control, afterburner control and heat recovery steam generator control in the present description.

U.S. Pat. No. 3,948,043 (Martz) discloses a combined cycle power plant in which the gas turbine and afterburner have coordinated fuel transfer.

U.S. Pat. No. 3,939,328 (Davis) shows adaptive process control for a combined cycle electric power plant, especially for boiler control therein. U.S. Pat. No. 3,939,328 is hereby incorporated by reference.

U.S. Pat. No. 4,168,608 (Uram) shows coordinated control between gas turbine, afterburner, heat recovery generator and steam turbine in a combined cycle power plant. U.S. Pat. No. 4,168,608 is incorporated by reference for that purpose.

U.S. Pat. No. 4,184,324 (Kiscaden et al.) discloses coordinated loading of the gas turbine and steam turbine and of operation of the afterburner in a combined cycle power plant. U.S. Pat. No. 4,184,324 is incorporated by reference for that purpose.

SUMMARY OF THE INVENTION

In a combined cycle power plant including a steam turbine and at least on heat recovery steam generator energized by a gas turbine and afterburner, load changing through a wide range is made possible without substantially affecting the outlet temperature of superheated steam to the steam turbine by modulating concurrently at least two of possible three independent variables, namely: afterburner firing, attemperator action on the superheated steam and the inlet guide vanes commanding access of air at the inlet of the gas turbine.

As a result, steam can be generated at the desired temperature with maximum efficiency; gas turbine loading can be varied through a wide range without affecting the operative outlet temperature to the steam turbine; and operative gas turbine load rate of change will not affect the heat recovery steam generator operation.

DESCRIPTION OF THE PREFERRED EMBODIMENT

Figure 1:
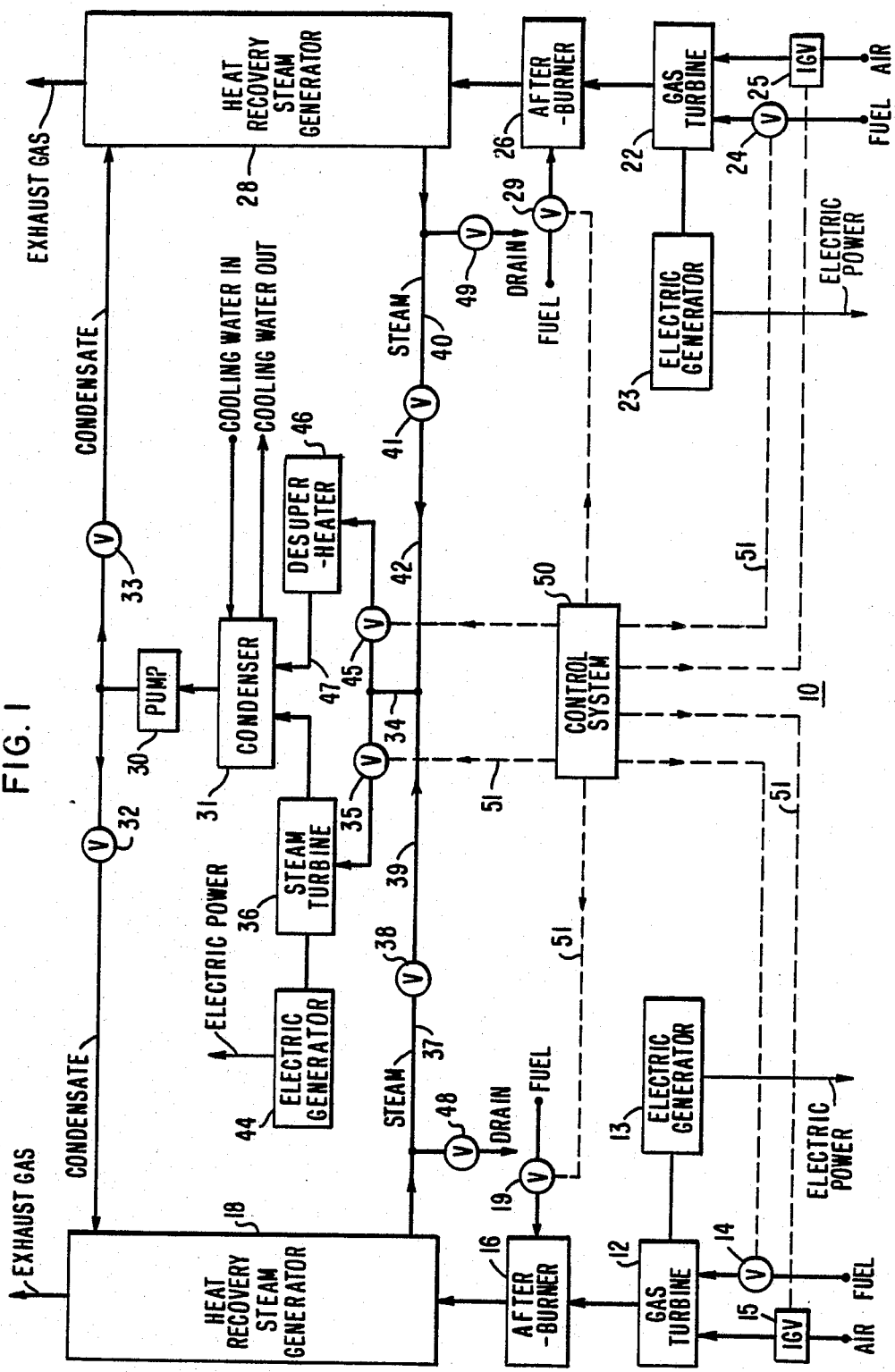
FIG. 1 is a schematic view of a combined cycle power plant with the associated control system.

Referring to FIG. 1, there is shown a functional block diagram of a combined cycle electric power generating plant. Reference numeral 10 is the combined cycle plant as a whole. As such, the plant 10 includes a first gas turbine 12 (sometimes referred to as "gas turbine No. 1", or CT1) which drives a first electric generator 13. Fuel is supplied to the gas turbine 12 by way of a fuel control valve or throttle valve 14. Air enters the gas turbine 12 by way of a variable inlet guide vane mechanism 15 (IGV in FIG. 4) which controls the degree of opening of the turbine air intake and which is used to adjust air flow during the start-up phase and to increase part load efficiency. The fuel supplied by the throttle valve 14 is burned in the gas turbine 12 and the resulting high temperature exhaust gas is passed through an afterburner 16 and a heat recovery steam generator 18, then, exhausted into the atmosphere.

Heat recovery steam generator 18 (sometimes referred to as "heat recovery steam generator No. 1", or HRSG1) includes boiler tubes which are heated to a relatively high temperature by the gas turbine exhaust gas passing through the steam generator 18 stack. Afterburner 16 (AB1) includes a burner mechanism for further increasing the temperature of the gas turbine exhaust gas before it enters the steam generator 18. Fuel is supplied to the afterburner 16 by way of a fuel control valve or throttle valve 19 (ABV in FIG. 4). The primary heat source for the steam generator 18 is the gas turbine 12, the afterburner 16 being an additional heat source for providing more heat when needed. In terms of typical fuel usage, approximately 80% of the fuel is used in the gas turbine 12 and 20% is used in the afterburner 16.

The combined cycle plant 10 further includes a second gas turbine 22 (sometimes referred to as "gas turbine No. 2", or CT2) which drives a second electric generator 23. Fuel is supplied to the gas turbine 22 by way of a fuel control valve or throttle valve 24. Air enters the gas turbine 22 by way of a variable inlet guide vane mechanism 25 which is used to adjust air flow during turbine start-up and to increase part load efficiency. The fuel supplied by throttle valve 24 is burned in the gas turbine 22 and the resulting high temperature exhaust gas is passed through an afterburner 26 and a heat recovery steam generator 28 and is then exhausted into the atmosphere.

Heat recovery steam generator 28 (sometimes referred to as "heat recovery steam generator No. 2", or HRSG2) includes boiler tubes which are heated to a relatively high temperature by the gas turbine exhaust gas passing through the steam generator 28. afterburner 26 (AB2) includes a burner for further increasing the temperature of the gas turbine exhaust gas before it enters the steam generator 28. Fuel is supplied to the burner mechanism in the afterburner 26 by way of a fuel control valve or throttle valve 29. The primary heat source for steam generator 28 is the gas turbine 22, the afterburner 26 is an additional heat source for providing more heat when needed. In terms of typical total fuel consumption, approximately 80% of the fuel is used in the gas turbine 22 and 20% is used in the afterburner 26.

A condensate pump 30 pumps water or condensate from a steam condenser 31 to both of the steam generators 18 and 28, the condensate flowing to the first steam generator 18 by way of a condensate flow control valve 32 and to the second steam generator 28 by way of a condensate flow control valve 33. Such condensate flows through the boiler tubes in each of the steam generators 18 and 28 and is converted into superheated steam. The superheated steam from both of the steam generators 18 and 28 is supplied by way of a common header or steam pipe 34 and a steam throttle valve or control valve 35 to a steam turbine 36 for purpose of driving such steam turbine 36. The steam from the first steam generator 18 flows to the header 34 by way of a steam pipe 37, a block valve 38 and a steam pipe 39, while steam from the second steam generator 28 flows to the header 34 by way of a steam pipe 40, a block valve 41 and a steam pipe 42.

The spent steam leaving steam turbine 36 is passed to the condenser 31 wherein it is condensed or converted back into condensate. Such condensate is thereafter pumped back into the steam generators 18 and 28 to make more steam. Steam turbine 36 drives a third electric generator 44.

A steam bypass bath is provided for use at appropriate times for diverting desired amounts of steam around the steam turbine 36. This steam bypass path includes a steam turbine bypass valve 45 and a desuperheater 46, the output side of the latter being connected to the condenser 31 by way of a pipe 47. A drain valve 48 is provided for the first steam generator 18, while a drain valve 49 is provided for the second steam generator 28.

The operation of the combined cycle electric power generator plant 10 is controlled by a control system 50, typical control signal lines 51 being shown in a broken-line manner.

Typically, the combined cycle plant 10 develops a nominal maximum power generating capacity of 260 megawatts. In such a plant, each of the gas turbines 12 and 22 is capable of producing a maximum of approximately 80 megawatts of electrical power under ISO conditions (59° Fahrenheit at sea level) and the steam turbine 36 is capable of producing a maximum of approximately 100 megawatts of electrical power. Thus, loss of any of the turbines 12, 22 and 36, for example, would not reduce total plant capacity by as much as 50%.

The functional block diagram of FIG. 1 has been simplified to facilitate understanding of the combined cycle plant 10. A major simplification in FIG. 1 concerns the fuel valves 14, 19, 24, and 29.

Figure 2:
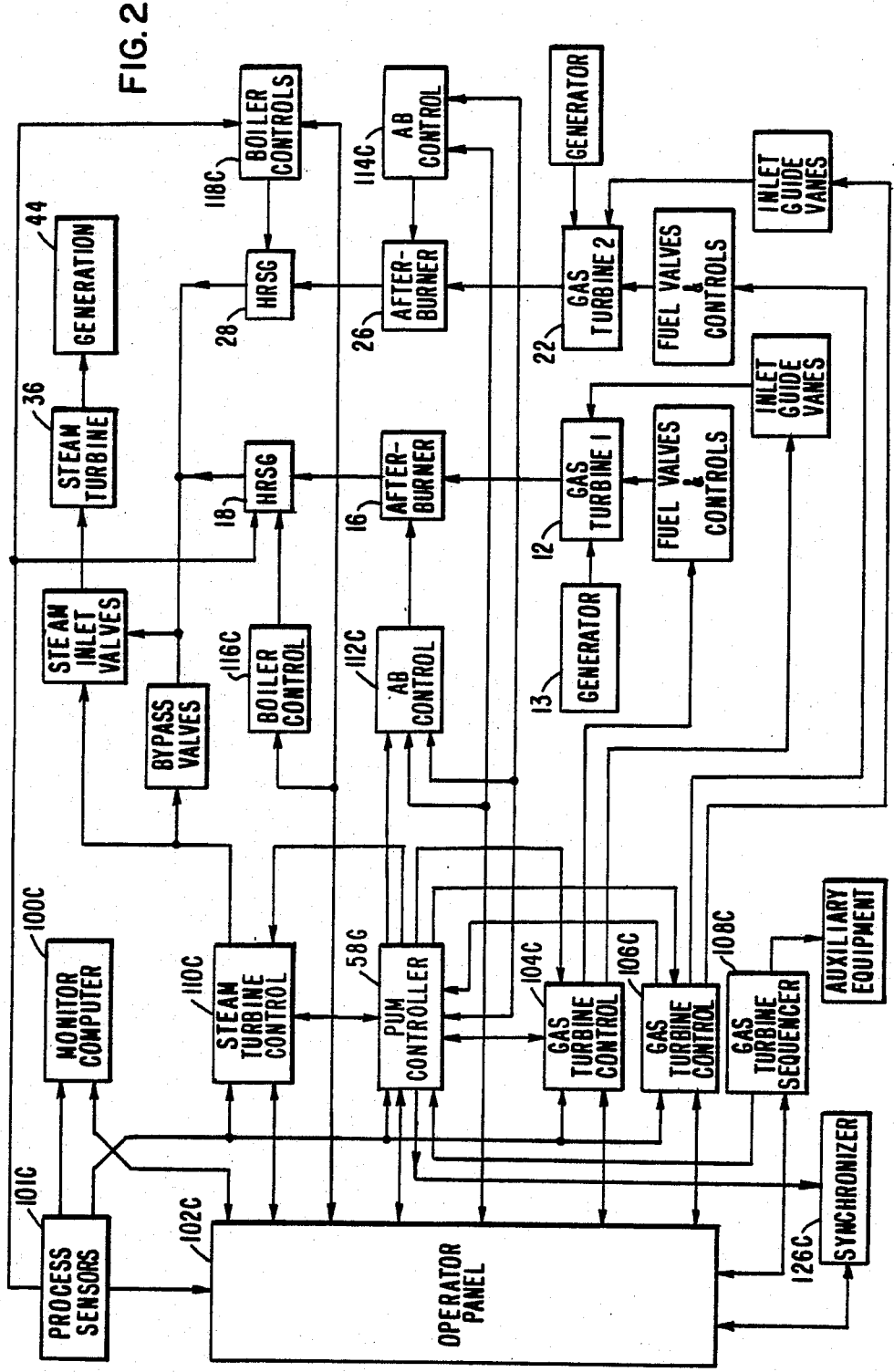
FIG. 2 is a schematic view showing the control system of the combined cycle power plant of FIG. 1.

As shown in FIG. 2, the control system 50 includes a PUM controller 58G, a digital monitor computer 110C and various analog controls for operating the plant equipment in response to process sensors 101C while achieving the described objectives. In this instance start-up control for the steam turbine 36 is largely embodied in the monitor computer 110C. An operator panel 102C provides numerous pushbutton switches and displays. The pushbutton switches provide for numerous operator control actions including plant and turbine mode selections and setpoint selections.

The operator sets the fuel level for the gas turbines 12 and 22 and the afterburners 16 and 26 through gas turbine controls 104C and 106c during loading and start-up. Control, included in each of the gas turbine controls 104C and 106C, automatically schedules fuel during gas turbine start-ups. In addition, sequencers 108C start and stop auxiliary equipment associated with the gas turbines during gas turbine start-ups. The turbine bypass steam flow and the turbine inlet steam flow are controlled by operator valve positioning implemented by a steam turbine control 110C during steam turbine start-up and loading. Certain automatic control functions are also performed for the steam and gas turbines by controls 104C, 106C and 110C.

In the operator automatic mode, the PUM controller 58G and monitor computer 100C perform various control functions which provide for automatic start-up and automatic loading of the gas and steam turbines under the direction of the operator on a turbine-by-turbine basis. Afterburner controls 112C and 114C and boiler controls 116C and 118C operate under operator setpoint control during the operator analog and operator automatic modes.

Under plant coordinated control, the PUM controller 58G performs all of the control functions that can be assigned to it, directing the plant operation through start-up, synchronization and loading to produce the plant power demand. The boiler controls 116C and 118C react automatically to operator setpoints and signals generated by the process sensors 101C to control the steam generators according to plant conditions produced by coordinated turbine and afterburner operations. The PUM controller 58G provides setpoint signals for the afterburners. The boiler controls further are supervised by the afterburner setpoint signals which are received at the analog control center.

Figure 3:
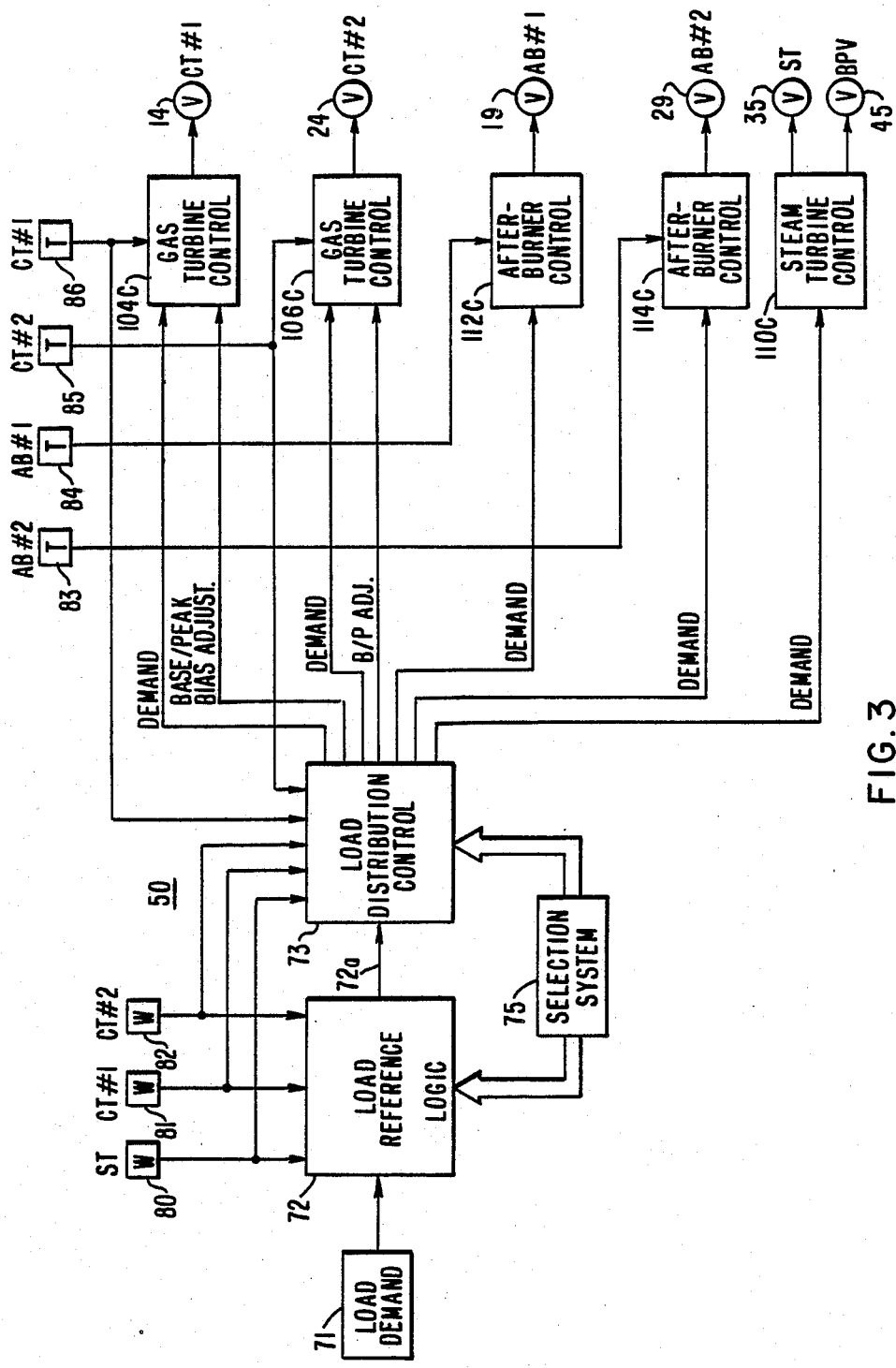
FIG. 3 is a block diagram showing a conceptual functional organization of the control system of FIG. 1 for load control operation.

Referring now to FIG. 3, there is shown in greater detail the nature of the control system 50. As indicated in FIG. 3, the control system 50 includes a load demand unit 71 which generates an electrical signal representing the desired total plant output power level. Unit 71 includes means for enabling the plant operator or engineer to change the load demand signal to any value he may wish to select. The load demand signal from unit 71 is supplied on line 71a to a load reference logic unit 72 which also receives the load level output signals from the megawatt sensors 80, 81 and 82. Load reference logic unit 72 produces on its output line 72a a load reference signal which, depending on the operating mode, may or may not be the same as the load demand signal 71a from unit 71. The load reference signal 72a from unit 72 is a computed signal which directs the manner in which the system will move to the load demand. It is supplied to a load distribution control unit 73.

Load distribution control unit 73 is responsive to the MW demand from meters 80, 81, 82 and sends appropriate individual demand signals to a first gas turbine control unit 104C which drives the first gas turbine fuel valve 14, a second gas turbine control unit 106C which drives the second gas turbine fuel valve 24, a first afterburner control unit 112C which drives the first afterburner fuel valve 19, a second afterburner control 114C which drives the second after-burner fuel valve 29, and a steam turbine control 110C which controls the steam turbine throttle valve 35 and the steam bypass valve 45. Temperature indicating signals from temperature sensors 86, 85, 84 and 83 (from GT1, GT2, AB1 and AB2, respectively) are supplied to the gas turbine control unit 104C, the gas turbine control 106C, the afterburner control unit 112C, and the afterburner control unit 114C, respectively. Signals from temperature sensors 86 and 85 are also supplied to the load distribution control unit 73. Operating modes for the load reference logic 72 and the load distribution control unit 73 are established by signals supplied to these units by a selection system 75.

Figure 4:
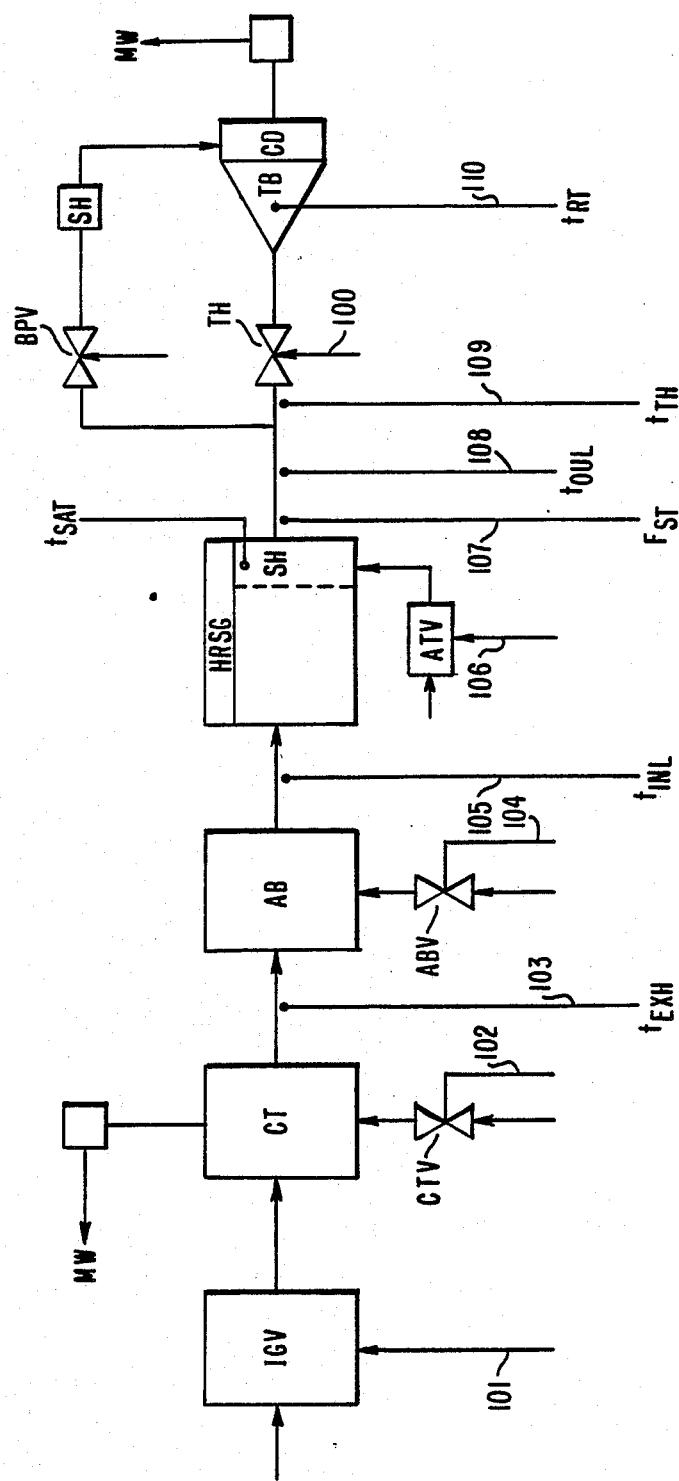
FIG. 4 shows schematically the main sensing points and control points used in accordance with the present invention for maintaining or establishing a heat recovery steam generator outlet temperature.

FIG. 4 schematically shows on a combined cycle power plant what the main sensing points and the main control points, according to the present invention, are. The combustion turbine CT inlet ambient air is controllably admitted through inlet gas vane mechanism IGV. The exhausted gases at temperature $t_{EXH}$ are further heated by an afterburner AB, and passed thereafter as inlet gas at temperature $t_{INL}$ to the heat recovery steam generator HRSG, for instance a boiler, the superheater SH thereof outputting superheated steam at temperature $t_{OUL}$ into steam line STL, through throttle valve TH at temperature $t_{TH}$ onto steam turbine TB. Combustion turbine CT and steam turbine TB both generate electrical power MW. The IGV mechanism is controlled by line 101. Firing of the gas turbine is controlled by controlling fuel admission, through combustion turbine valve CTV, via line 102. Afterburner AB firing is controlled by controlling fuel admission through afterburner valve ABV via line 104. Superheated steam output temperature $t_{OUL}$ is normally regulated as generally known, with an attemperator including a valve ATV controlled by line 106 to adjust spraying of cold water into the steam at a midpoint of the superheater tubes. Admission of steam to the turbine is controlled via line 100 by a throttle valve TH (which is a simplified representation of the throttle valves and associated governor valves under control of the DEH system which automatically, as well as under operator supervision, establishes the load of the steam turbine). The temperature $t_{EXH}$ at the exhaust of the combustion turbine is derived on line 103. Temperature $t_{INL}$ at the inlet of the heat recovery steam generator HRSG, e.g., at the outlet of the afterburner, is derived on line 105. Temperature of steam $t_{OUL}$ at the outlet of the superheater SH is derived on line 108. Steam flow $F_{ST}$ at the outlet of the heat recovery steam generator HRSG is sensed and a representative signal is derived on line 107. Steam temperature $t_{TH}$ at the inlet of throttle valve TH (35 in FIG. 3) is derived on line 109. Steam turbine rotor temperature $t_{RT}$ is derived on line 110, and used preferably through the logic of a skid controller.

Figure 5A:
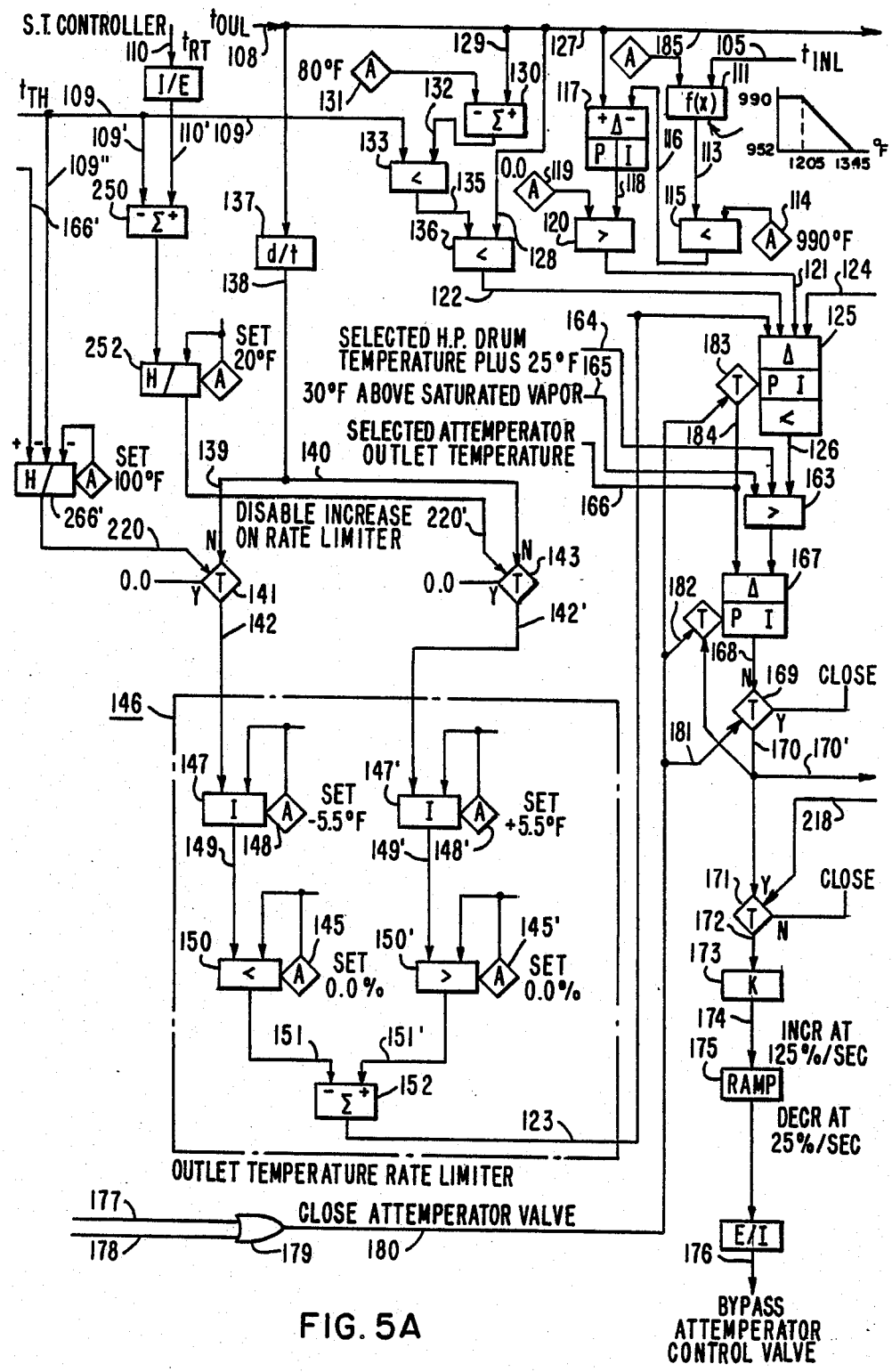
FIGS. 5A and 5B together show in block diagram circuitry for the improved attemperator controller according to the present invention.
Figure 5B:
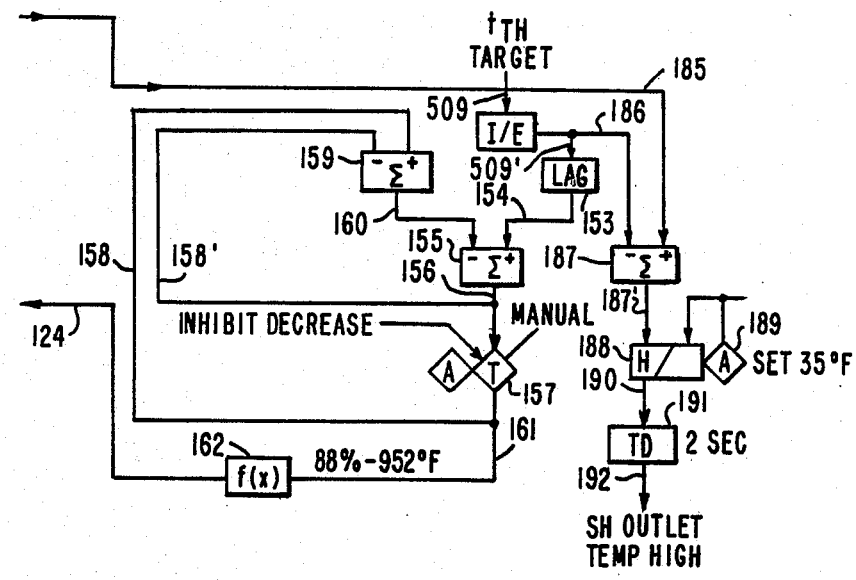
Figure 5B:
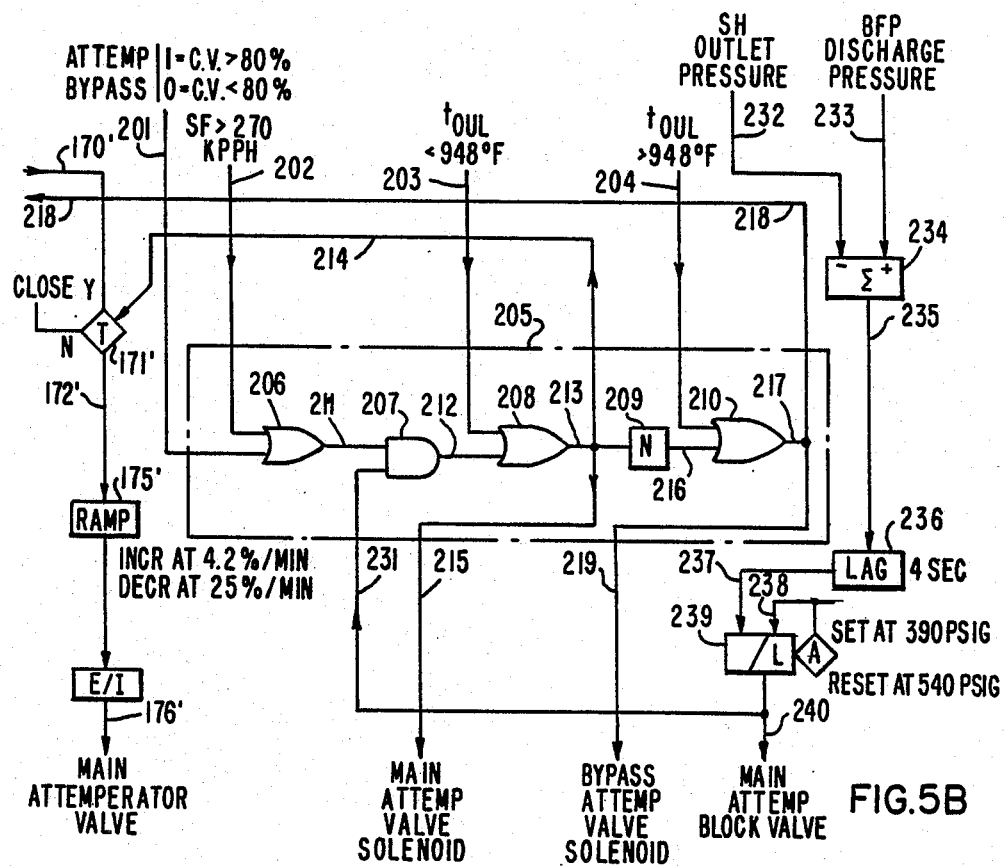

Referring to FIGS. 5A and 5B, attemperator control, according to the present invention, will now be described by reference to specific circuitry in the preferred embodiment. As generally known, temperature $t_{OUL}$ of the generated superheated steam from the superheater SH can be modified with the assist of an attemperator by controlling a main control valve and a bypass control valve concurrently determining the supply of cold water into the steam of the superheater. In FIG. 5B, the main attemperator control valve is controlled on line 176' with a ramping setpoint established by a ramp function generator 175', whereas, as shown in FIG. 5A, the bypass attemperator control valve is controlled on line 176 with a ramping setpoint established by a ramp function generator 175. The overall description of FIGS. 5A, 5B hereinafter explains how proper setpoint signals 170 and 170' are treated and inputted into ramp generators 175 and 175', respectively.

The temperature $t_{TH}$ of steam beyond the common header toward the throttle valves of the steam turbine is inputted as sensed by line 109 (FIG. 5A) whereas a targeted temperature for such steam is inputted by line 509 (FIG. 5B). The temperature $t_{OUL}$ as sensed at the output of the boiler, e.g. the superheater SH of the heat recovery steam generator HRSG is inputted by line 108 (FIG. 5A). When there are two boilers, the temperature $t_{TH}$ is in fact the temperature of steam mixed from the two boilers, while $t_{OUL}$ is the temperature at the output of one boiler (FIG. 5A) as selected for line 108. It is generally understood that control of the attemperator (by lines 176 of FIG. 5A and 176' of FIG. 5B) will modify $t_{OUL}$ and therefore the actual steam temperature. As shown in FIG. 5A, a superheated steam outlet temperature controller 125 is provided including a differential (Δ) input and a PI function for control generating a control signal on line 126 in accordance with the error detected at the input. The inputs to controller 125 include the target signal of line 509 properly modified, as hereinafter explained, for input line 124 and the actual signal of line 109 for the steam turbine inlet temperature $t_{TH}$, itself modified properly to form the actual input of line 122 to controller 125. As shown in FIG. 5A, a low select circuit 133 receives the signal of line 109 and the output of a subtractor 130 having a negative input set at 80° F. and a positive input representing by lines 108 and 129 the $t_{OUL}$ signal. Thus, a margin of 80° F. below $t_{OUL}$ is created for comparison with $t_{TH}$. It is observed in this respect that the mixed steam at a given moment may be above or below the temperature of the selected boiler output of line 108. At 136 a low select circuit compares the signal derived between lines 109 and 132 to the signal of line 108, thereby establishing on line 122 an actual signal for the input of controller 125.

Considering now the target for $t_{TH}$ as derived on line 509, this signal is provided by the PUM controller. After conversion to a voltage signal on line 509', this signal experiences at 153 a lag of 1 second behind actual valve attemperator control by lines 176 and 176'. The delayed signal appears on line 154 and after passing through summer 155, goes to line 156, then to line 161 beyond a two-position switch 157 assumed to be closed for line 156. The signal of line 161 is converted into a representation of superheated steam outlet temperature by a function generator 162 characterized typically by a continuous function from 600° F. output for 0% at the input to 985° F. at 100%, the normal operative value desired of 952° F. being for 88% at the input. The target signal so derived appears on line 124 at the input of superheated steam outlet temperature controller 125, to be compared to the superheated steam outlet temperature representative signal of line 122.

Low select circuits 133 and 136 (FIG. 5A) account for the difference of temperature level between the mixed steam inputted into the turbine from two boilers ($t_{TH}$ on line 109) and the superheated steam from the selected boiler ($t_{OUL}$ on line 108), thereby to give priority to the temperature which has to catch-up. Thus, on a cold start the turbine may be only at 700° F. whereas the boiler has already reached a level in the 900° F. Conversely, one boiler may still be cold when the turbine is already operating under supply of hot steam from the other boiler. Accordingly, on line 122 the control signal will make the actual temperature signal appear to be lower than it really is on line 109, or on line 108.

While opposite signals on lines 122 and 124 concur at the input of controller 125 in establishing attemperator control, this action can be superseded by an override signal outputted on line 118 by an override controller 117 and converted into an error signal on line 121 by a high select circuit 120 having zero as the minimum level setpoint by line 119.

Still referring to FIG. 5A, override controller 117 includes a subtractor function at the input and a proportional plus integral function responsive to the comparison effected between the signal $t_{OUL}$ derived from line 108 and a signal on line 116 which is depending upon the gas inlet temperature $t_{INL}$ of the selected boiler, which is derived on line 105. The override controller provides a controlling input on line 121 to the superheater outlet temperature controller 125 whenever required, as follows:

The desired operative steam temperature $t_{OUL}$ is assumed to be at 952° F., namely the level for the steam turbine in normal operation. It is important for the tubes of the boiler which are exposed to the hot gas through the stack that steam temperature inside the tubes remain at the operative level of 952° F., and that, if it is going higher, never above a limit of 990° F. This is a requirement given by the manufacturer. With this particular example, a curve is shown in FIG. 5 (referring to function f(x) in function generator 111) indicating that when the average inlet temperature $t_{INL}$ at the inlet to the heat recovery steam generator goes as high as 1345° F., the admissible outlet temperature for the superheated steam will be as low as 952° F., whereas when such inlet temperature is down to 1205° F., and there is a need for more heat from one boiler, the outlet temperature of the steam can go as high as 990° F. but not more. This upper limit is established by a low select circuit 115 having a limit set at 990° F. by line 114. In these ranges, the output on line 115 will vary linearly between these two limits, as shown by the curve. Override controller 117 will compare $t_{OUL}$ of time 108 to the $t_{INL}$ related signal of line 116, thereby to detect an error whenever the actual temperature $t_{OUL}$ exceeds the signal of line 116. If an error is detected, as confirmed by high select circuit 120 which has on line 119, a minimum of zero, control signal on line 121 will cause the otherwise assigned $t_{OUL}$ setpoint for the attemperator to be reduced. The attemperator reducing action will continue to be caused by line 176 until the error between lines 108 and 116 has been reduced to zero, e.g. whenever the zero setting of line 119 to high select circuit 120 is no longer exceeded. Normal operation of the superheated steam outlet temperature controller 125 will now be considered from a consideration of the target signal on line 124 and the actual signal on line 122.

If the target signal of line 124 causes an error to appear between lines 122 and 124 at the input of controller 125, the proportional plus integral functions thereof will cause a control signal to appear on line 126, establishing a setpoint for correction via ramps 175 (for the bypass control valve of the attemperator), and 175' (for the main control valve of the attemperator) e.g. to generate ramping control signals on the respective lines 176 and 176'.

However, in order not to violate any temperature requirement which would entail the formation of moisture and droplets in the superheated steam, inner loops are provided via lines 164, 165 and 166 which are compared with the controller output signal of line 126, thereby to condition the controlling effect of the signal of line 126 by the adjunction of the attemperator outlet temperature controller 167 within the outer loop. This stems from the fact that the desired attemperator outlet temperature effective on line 126, cannot be less than the HP drum temperature in the boiler plus 25° F. (which is derived on line 164), nor less than the temperature of saturation of the vapor plus 30° F. (which is derived on line 165). High select circuit 163 insures that only the larger one of the three signals of lines 126, 164 and 165 will be controlling. Finally, the controlling signal from circuit 163 is compared to the actual attemperator outlet temperature derived (with a 3-second lag) on line 166. The cumulative effect of the three inner loops appears at the input of attemperator outlet temperature controller 167, which through its proportional plus integral functions provides on line 168 a control signal for the outer loop which is indicative of the amount of control needed for the attemperator e.g. in the form of a setpoint applied to the two ramp functions 175 and 175', complementarily for the bypass control valve (by line 176) and for the main control valve (by line 176'). In each of these two branches of control (FIGS. 5A and 5B) are provided two switches (169, 171) and (169', 171'), respectively, in order to insure closing of the attemperator valves in an emergency. This may happen via line 180 and line 181 to switch 169 for both branches, or from logic controller 205, either via line 218 to switch 171 for the bypass attemperator control valve, or via line 214 to switch 171' for the main attemperator control valve.

Ramp 175 of FIG. 5A which is relative to the bypass attemperator control valve, typically establishes a rate of 125%/sec. on the increase e.g. on the opening of the bypass valve, and 25%/sec. on the decrease of the ramp, e.g. on closing the bypass valve, whereas ramp 175' of FIG. 5B which is relative to the main control valve of the attemperator has a rate of 4.2%/min. on the increase and 25%/min. on the decrease.

Referring to FIG. 5B, logic controller 205 controls when the bypass attemperator control valve is open or closed (via line 218 to the two-position switch 171 of FIG. 5A) and when the main attemperator control valve is open or closed (via line 214 to the two-position switch 171' of FIG. 5B).

When the output temperature of the boiler is larger than 948° F. (a ONE on line 203 into block 205 of the logic controller) OR device 208 and lines 213, 214, switch 171' is set into position Y to command main attemperator valve control. At the same time, if the output temperature $t_{OUL}$ is lower than 1000° F., line 204 has a zero, and since NOT device 209 in response to the ONE of line 213 sets a zero on line 216, the OR device 210 by line 218 sets a zero onto switch 171, whereby the bypass attemperator valve is closed (position N). Thus, only the main valve is working when 948° F.<$t_{OUL}$<1000° F. If, however, $t_{oul}$>1000° F. as shown by line 204 and via OR device 210, lines 217 and 218 cause OUL also switch 171 to open (position Y), whereby both valves are working.

The logic of controller 205 also provides for a ONE on line 214 when (1) on line 201 the attemperator bypass valve is open at more than 80%, or (2) on line 202 steam flow is larger than 270 KPPH, these two alternate conditions being passed by OR device 206 onto line 211 at the input of AND device 207 *and* on line 231 the ΔP or pressure gradient across the attemperator spray valve (expressed by the difference between the boiler feedpump discharge pressure on line 233 and the steam outlet pressure on line 232 as outputted by subtractor 234 onto line 235 and carried after a lag of 2 sec. at 236 onto line 237) is less than 390 psig (as detected by low limit device 239 set at 390 psig and reset at 540 psig), then, AND device 207 by line 212, via OR device 208 and line 214, will also cause the main attemperator valve to be controlled open.

Complementarity of control with respect to the bypass attemperator valve is through OR device 210 either from line 213 after logic inversion by device 209 onto line 216, or from line 204 ($t_{OUL}$>1000° F.). Then, control is effected by line 218 onto two-position switch 171, in the bypass attemperator control valve line of control.

Still on FIG. 5B summer 155 subtracts from the signal of line 154 a signal derived on line 160 from an error sensing summer 159 responding on line 158 as a positive input to the signal of line 161 and on line 158 as a negative input to the signal of line 156.

As a protective measure signal $t_{OUL}$ of line 108 is applied by line 185 to a subtractor 187 together with the targeted steam temperature of line 509', namely the latter by line 186. The difference on line 187' is passed into a high limiter 188 set at 350° F. The output thereof, on line 198 is passed on line 192 after a 2 sec. lag at 191.

Referring to FIG. 5A, in addition to being responsive to the target signal for the steam derived from line 124, the actual temperature on line 122 and the overriding signal of line 121, controller 125 is also responsive to a rate limiter signal derived on line 123 from block 145 as follows:

From lines 108 and 127, the actual superheater outlet temperature $t_{OUL}$ is applied to a differentiator 137 providing on line 138 the rate of change of $t_{OUL}$. Line 138 goes by lines 139 and 140 to respective switches 141 and 143 which, when in the passing position, lead to lines 142 and 142', respectively.

If the rate on line 138 is excessive, this is detected on the decrease side by block 147 which compares the actual rate to a rate set at −5.5° F. per minute, or on the increase side by block 147' which compares the actual rate to the set value of +5.5° F. per minute. As a result, low select device 150 on the decrease side, or high select device 150' on the increase side, will cause a corrective signal to be generated on the respective lines 151 and 151' which both are inputted into subtractor 152. The corrective signal in either instances will appear on line 123 to correct the action of controller 125 by the amount required in either direction. Accordingly, water will be sprayed more or less on the superheated steam by the attemperator to moderate the control action under the target temperature of line 124.

The rate limiter 146 is disabled by line 220' and switch 143 on the increase when the difference between the rotor temperature derived on line 110 and the mixed temperature $t_{TH}$ derived on line 109' exceeds 20° F., as detected by subtractor 250 and high limit device 252 set at 20° F. The rate limiter is disabled on the decrease by line 220 and switch 141 when the difference between the superheated steam temperature derived on line 166' and the mixed temperature $t_{TH}$ derived on line 109'' exceeds 100° F., as detected by high limit device 266' which is set at 100° F.

Figure 5C:
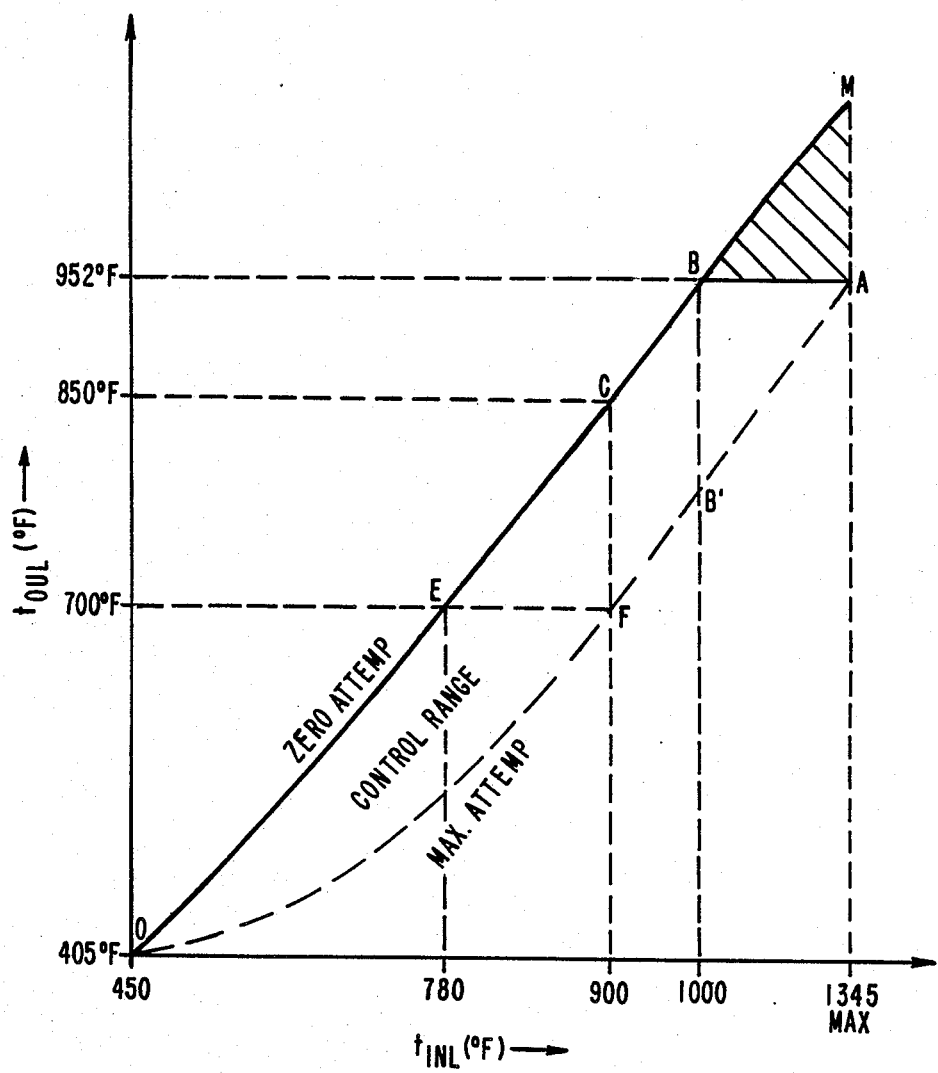
FIG. 5C illustrates with curves the effect on the outlet temperature of controlling concurrently the afterburner and the attemperator, in accordance with the present invention.

FIG. 5C shows the response characteristic curves of the boiler to gas inlet at temperature $t_{INL}$ when outputting superheated steam at a temperature $t_{OUL}$. The range for the superheated steam at the outlet of the heat recovery steam generator varies between 405° C. up to in excess of 1000° F. as a function of the gas temperature at the inlet thereof. When there is no attemperation (curve OECBM), a higher range of variations for $t_{OUL}$ is taking place. Assuming that the attemperator is operating with its maximum effect, the range of variation is along OFA. It is assumed that under normal conditions of operation of the steam turbine (wattage generated, rotor temperature, throttle temperature, steam flow and pressure) cogeneration with the steam turbine is performed with an outlet temperature of 952° F. from the boiler. The controller according to the invention maintains such boiler outlet steam temperature to such desired value while optimizing boiler efficiency, namely through the afterburner and, as explained hereinafter, through control of the inlet guide vanes IGV's of the combustion turbine, without substantially affecting the operative temperature of the steam turbine. More generally, the HRSG air inlet temperature is allowed to float without affecting the turbine operative steam temperature at the outlet thereof. As a result of such approach, it becomes possible to modulate the combustion turbine through a wide range of power loads and still to keep the steam turbine access steam substantially unaffected.

Some of these points will appear from a consideration of the effect of attemperator control according to FIGS. 5A and 5B on the operative points of the curves of FIG. 5C, as follows:

If, initially, the outlet temperature is 952° F. when the gas inlet temperature is 1345° F., as at operative point A when the attemperator is at its maximum, it is possible to control the firing of the afterburner so as to reduce the inlet temperature from say full firing at 1345° F. to the shut-off position at 1000° F. In this event the operative point A with maximum attemperation will follow AB' along the maximum attemperation curve. If we assume now that there is zero attemperation, for 1000° F. the operative point is at B. If the gas inlet is now allowed to increase by firing the afterburner, the operative point would follow BM along the zero attemperation curve. If attemperator control is effected while changing the inlet gas temperature $t_{INL}$, it appears that (1) temperature control eliminates the shaded area AMB which is not desirable because $t_{OUL}$ would be too high; and (2) that it is possible to keep $t_{OUL}$ constant, e.g. along AB when $t_{INL}$ varies. Thus, control at the entry of the boiler will not affect the established steam temperature $t_{OUL}$ at the output thereof.

If shut-off of the afterburner does not coincide with the abscissa of point B, reduction of the duct burners might go as far as the abscissa of point C. This means that control of the afterburner beyond point B will follow BC, when the attemperator is at its zero limit.

FIG. 5C also shows the situation when the steam turbine is only at 700° F. following starting. Attemperation, then, operates between E and F, thereby allowing to maintain the boiler output temperature at a comparatively low level until the steam turbine is in condition to gain heat.

Referring again to FIG. 5A, the throttle temperature $t_{TH}$ for the steam turbine derived on line 109 is compared by subtractor 250 with the rotor temperature $t_{RT}$ derived on line 110. Should the steam temperature at the throttle entrance be below the steam turbine rotor temperature, by line 251 a high select circuit biased at 20° F. will cause by line 220' switch 143 to take the Y-position for which the rate of change is zero. Therefore, the increasing rate of change in the rising direction for the rate limiter is defeated. Similarly, by line 220, switch 141 is set to its Y-position controlling zero rate of change whenever the superheater outlet temperature on line 166' is greater than the mixed steam temperature of the throttle on line 109 as derived from line 109:. The two signals are compared by high limiter circuit 266' which is set at 100° F. for the critical difference. Therefore, in such instance, by line 220 switch 141 is set to zero input and the rate of change for the rate limiter in the falling direction is defeated. To generalize, owing to FIGS. 5A, 5B the superheater outlet temperature $t_{OUL}$ satisfies the throttle temperature demand $t_{TH}$ for the steam turbine by:

Modulating the attemperator controller demand between the minimum and maximum permitted by the boiler. The outlet temperature required from one boiler may exceed the throttle temperature demand due to assumed mixing of steam in a common header with the other boilers. However, the boiler temperature demand may not be less than the throttle temperature demand. This feature provides for automatic balanced boiler loads in the steady state condition.

Moreover, the rate of change in the rising and falling directions are independently controlled and at independent rates. The rate of change in the falling direction is defeated when superheater outlet temperature is greater than the throttle temperature. The rate of change in the rising direction is defeated when the superheater outlet temperature is below the steam turbine rotor temperature.

Temperature is uniquely controlled to prevent water carryover out of the boiler due to excessive attemporator water flow. This is accomplished by determining the saturation temperature at the desuperheater outlet (line 165) and maintaining a minimum amount of superheat at this point.

Attemperator operation is also normally called upon, as generally known, by DEH operation within control system 50 of the steam turbine, whereby a level of steam temperature $t_{OUL}$ is determined concurrently by load control of the steam turbine.

Figure 6A:
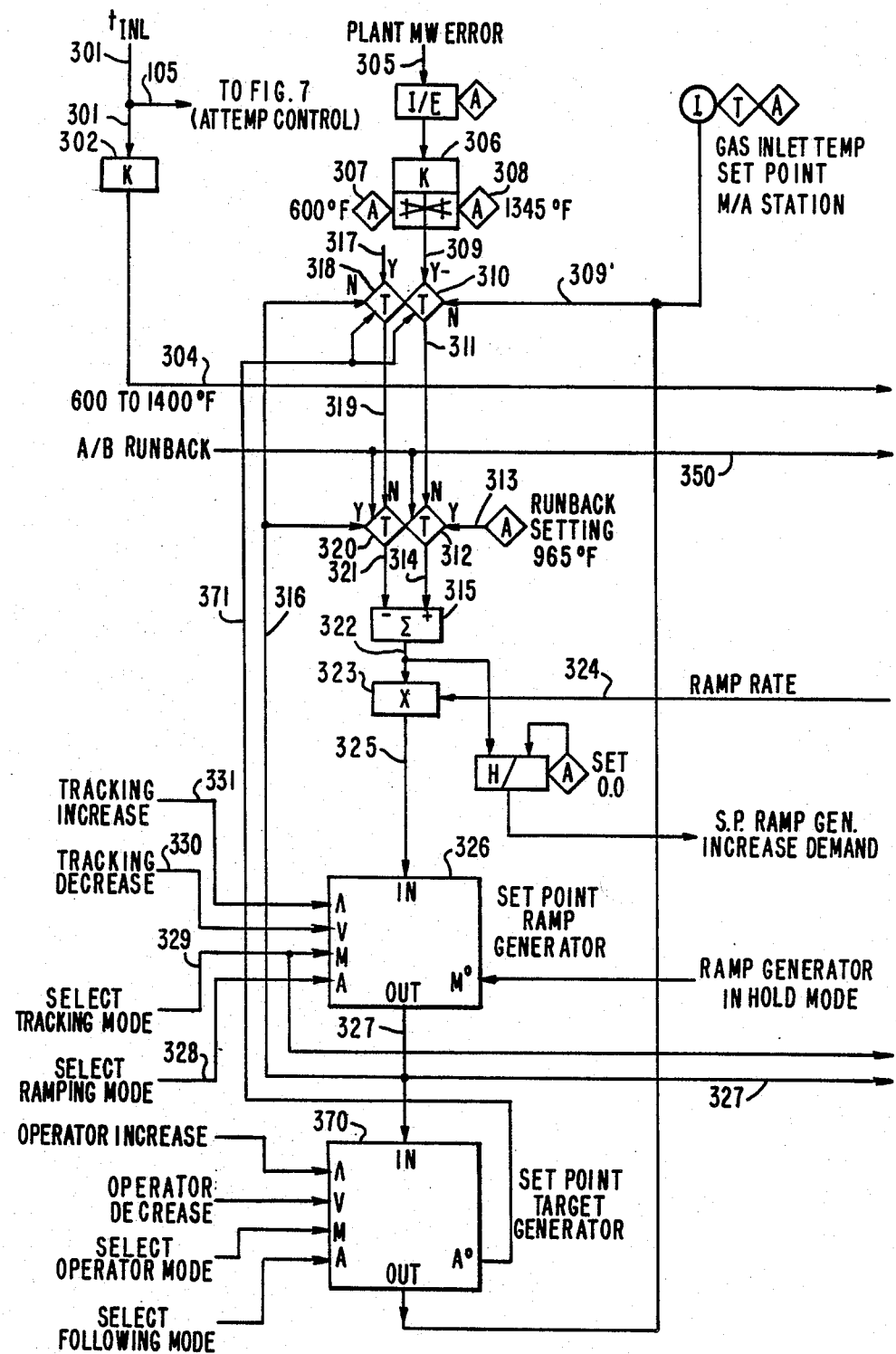
FIGS. 6A, 6B together show in block diagram circuitry for the improved afterburner controller in accordance with the present invention.
Figure 6B:
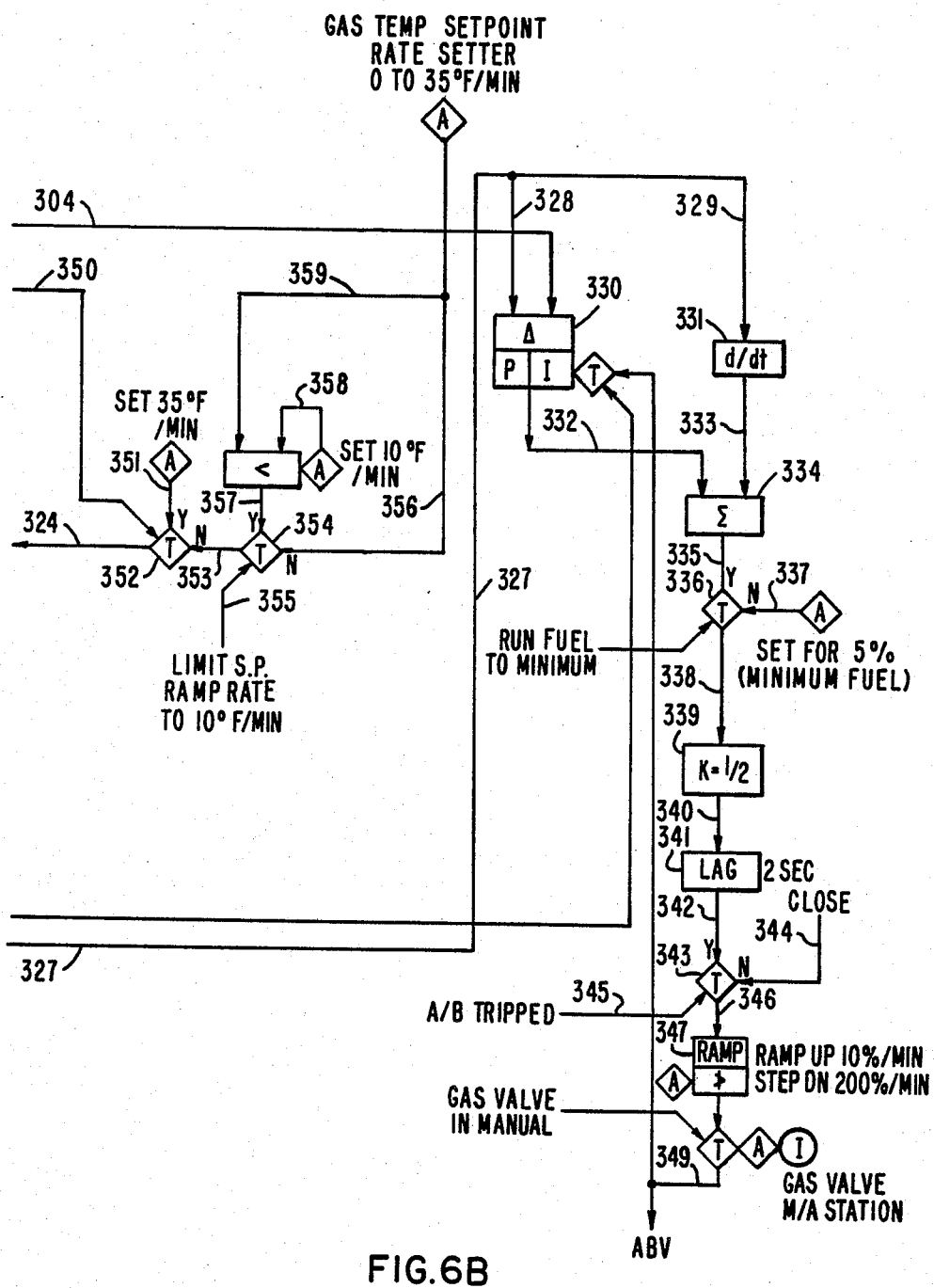

Referring to FIGS. 6A, 6B, there is shown control circuitry for the afterburner (A/B) associated with the combustion turbine. Control is effected via line 349 (FIG. 6B) by ramping to a setpoint value a signal determining positioning of the gas valve ABV which controls the firing of the duct burners. The action with the afterburner is complementary to load control of the combustion turbine for raising and maintaining the inlet gas temperature $t_{INL}$ to the heat recovery steam generator. According to the present invention this additional effect is part of a combination of means employed to keep the superheated steam outlet temperature, as seen by the steam turbine, substantially independent from the operation of the combustion turbine and boiler operation on the steam producing side. This is achieved, according to the present invention, by combining actions of the afterburner, of the inlet gas vane (IGV) system and of the attemperator, as will be shown hereinafter.

In the past, steam temperature and steam temperature rate of change were controlled by controlling the rate of temperature change of the gasses into the heat recovery steam generator. This was causing, however, a direct dependence between the action taken and the combustion turbine loading. Some form of correcting action was taken with the assist of the IGV control and of superheater control. In contrast, the present invention provides for an integrated system for modulating the afterburner, the attemperator and the IGV about the associated combustion turbine, as will appear from the description hereinafter. Moreover, as a result of such integrated modulation system, it becomes possible to accommodate and absorb rapid demand fluctuations with the combustion turbine and to effect AB control with a high gradient while limiting the temperature rate of change, typically at 70° F./minute. The invention also makes it possible to reconcile the different criteria for the steam turbine equipment, on the one hand, and the heat recovery steam generator, on the other hand. For instance, minimum and maximum temperatures are to match in the steam turbine those temperatures in the rotor of the turbine, and all along in between, during start up. Also, the minimum temperature when cooling has to be matched in order to avoid moisture deposition in the turbine. The rate of change is also of concern, nominally a 70° F./minute rate is not to be exceeded in order to avoid thermal stresses on the rotor cylinder. The present invention allows to overcome these limitations while applying a rate of change in the afterburner firing and in the combustion turbine loading.

Referring again to FIG. 6A, modulation of the afterburner by control of gas valve ABV, is effected as a function of plant megawatt error, derived from line 305. Line 305 has a signal derived from a combination of the pressure characteristic of steam turbine throttling and of the plant MW error of line 250 as seen in FIG. 5C of copending patent application W.E. 50,086. For the purpose of disclosure in this patent application, copending patent application W.E. 50,086 is hereby incorporated by reference.

Control in response to the signal of line 305 is translated into a setpoint signal representing the gas inlet temperature into the heat recovery steam generator which is applied as a control output signal on line 327 from the ramp setpoint generator 326. The signal of line 305 (after conversion to voltage signal) is scaled in block 306 and clamped as shown between 600° F. (at 307) and 1345° F. (at 308). The outputted control signal of line 309 passes two-position switches 310 and 312. Switch 310 is in the N position when block 370 by line 309' imposes a setpoint. It is assumed for the purpose of this description that switch 310 is in the Y position, thereby to respond to the signal of line 309. Switch 312 is in the Y position when the system requires the afterburner to be run back. The run back setting is established at 313. It corresponds to 965° F. which is about the gas turbine exhaust temperature and therefore takes the A/B burner to its minimum setting. It is assumed again that switch 312 is in a position to receive the signal of line 309 after it has passed switch 310 onto line 311. Then, the desired temperature is applied by line 314 to a summer 315, then, to the ramp function generator 326, with a selected rate applied thereon at 323 from line 324. The output of the ramp generator 326 is on line 327 which goes to controller 330 where the set value is compared with a feedback signal of line 304 which represents the temperature at the inlet of the heat recovery steam generator $t_{INL}$, that is the temperature of the gas at the exhaust of the afterburner AB. This signal is the temperature signal derived on line 105 of FIG. 4, and used as shown in FIG. 5A. The signal of line 105 is used as a feedback signal by lines 301 and 304 onto controller 330, as will appear from the description hereinafter. The signal of line 301 is scaled at 302 to provide on line 304 a signal representing a temperature between 600° and 1400° F.

Considering again switches 310 and 312, the feedback line 316 from output 327 is passed through two switches 318 and 320 associated with the switches 310 and 312, respectively, thereby to provide an error in summer 315 resulting from the comparison between the signals of lines 321 and 314 outputted by the respective switches. By changing switch 312 from position N to position Y, the signal of line 311 is replaced by the run back signal of line 313. Such run back setting is achieved from line 350 triggering switch 312 to the run back position. Typically, the run back setting of line 313 represents 965° F. This value in such case is applied on line 314. When, by line 350, a switch 352 (FIG. 6B) is set to the Y-position the ramp rate is maximum, typically at 35° F./minute as shown by line 351. Otherwise, switch 352 is in the N-position for which by line 356 the setpoint can be adjusted from 0 to 35° F./minute at will, provided switch 354 responds to line 356 being itself in the N-position. The rate may be kept below a maximum of 10° F./minute imposed at 358 onto line 357 beyond a high select circuit, if switch 354 is in the Y-position. Such maximum rate is imposed from line 355 commanding the positioning of switch 354. The selected rate is applied to the ramp function by line 324 to rate setting device 323. When run back setting is imposed by line 350, the output from the ramp function generator of line 327 is applied by line 316 as a feedback signal through switch 320 so that the feedback signal of line 321 is compared with the run back set point until the error is nullified on line 322 at the output of summer 315. Normally, the A/B is not on run back. Then, switches 310 and 318 are operating. The error with the feedback loop signal of line 316 is between lines (319, 321) and (311, 314), at the input of summer 315. The ramp rate is determined from line 356 via switch 354, line 353, switch 352 and line 324. The ramping setpoint at the output of the ramp function generator is on line 327 and applied to one input of controller 330 as well as to the input of differentiator 331. The signal of line 304 representing the inlet temperature reached by the gasses into the HRSG is applied to the other input of controller 330. Therefore, this signal is compared with the setpoint signal of line (327, 328) by controller 330. The proportional plus integral (PI) portion thereof generates on line 332 a command signal for the firing of the A/B. However, the signal of line 332 is first compared with the rate of change signal of line 333 at the output of the differentiator 331. These are summed in block 334 and the resulting signal on line 335 is converted in a well-known way to accommodate control of the fuel valve. First at 336 a switch normally in the Y-position allows in the N-position by line 337 to set a level of 5% when it is required to run at minimum fuel. Then, at 339 the signal of line 335 outputted on line 338 is scaled by the coefficient $k = \frac{1}{2}$. Thereafter, at 341, a lag of 2 sec. is introduced. At the output, on line 342, the resulting signal goes to a switch 343 normally in position Y which when in position N will allow by line 344 to close the fuel valve whenever by triggering line 345 the command on switch 343 is to trip the A/B. Thereafter, at 347 there is a ramp function translating the setpoint in terms of opening positions for the fuel valve. The ramp is at 10%/min. on the increase and 200%/min. on the decrease. The firing command for the afterburner valve ABV is on line 349.

The ramp function generator also provides for selecting a ramping mode on line 328, for selecting a tracking mode on line 329, for providing "tracking increase" by line 331 and for providing "tracking decrease" by line 330, as generally known. Also, switch 310 when in position N provides for controlling firing of the A/B from block 370 and by line 309'.

Referring to FIG. 5C of incorporated by reference copending patent application in case 50,806, it is observed that whenever steam turbine throttle pressure (on line 236) no longer matches the steam load throttling setpoint (line 227') as detected (at 254) a high select circuit (255) generates a signal (on line 257) which comes as a subtrahend with the plant MW error signal (line 254) thereby to reduce A/B firing (line 305) which extends in FIG. 6A therein conveying the effective Plant MW error signal to setpoint ramp function generator 326. Similarly, and more generally, in the system according to the present invention, exceeding the high limit of superheater outlet temperature, pressure, steam turbine throttle or extraction pressure will reduce afterburner firing, whereby an integrated effect is provided balancing the operation of the steam turbine with the operation of the HRSG independently controlled, about the superheated steam outlet temperature established inbetween.

Figure 7:
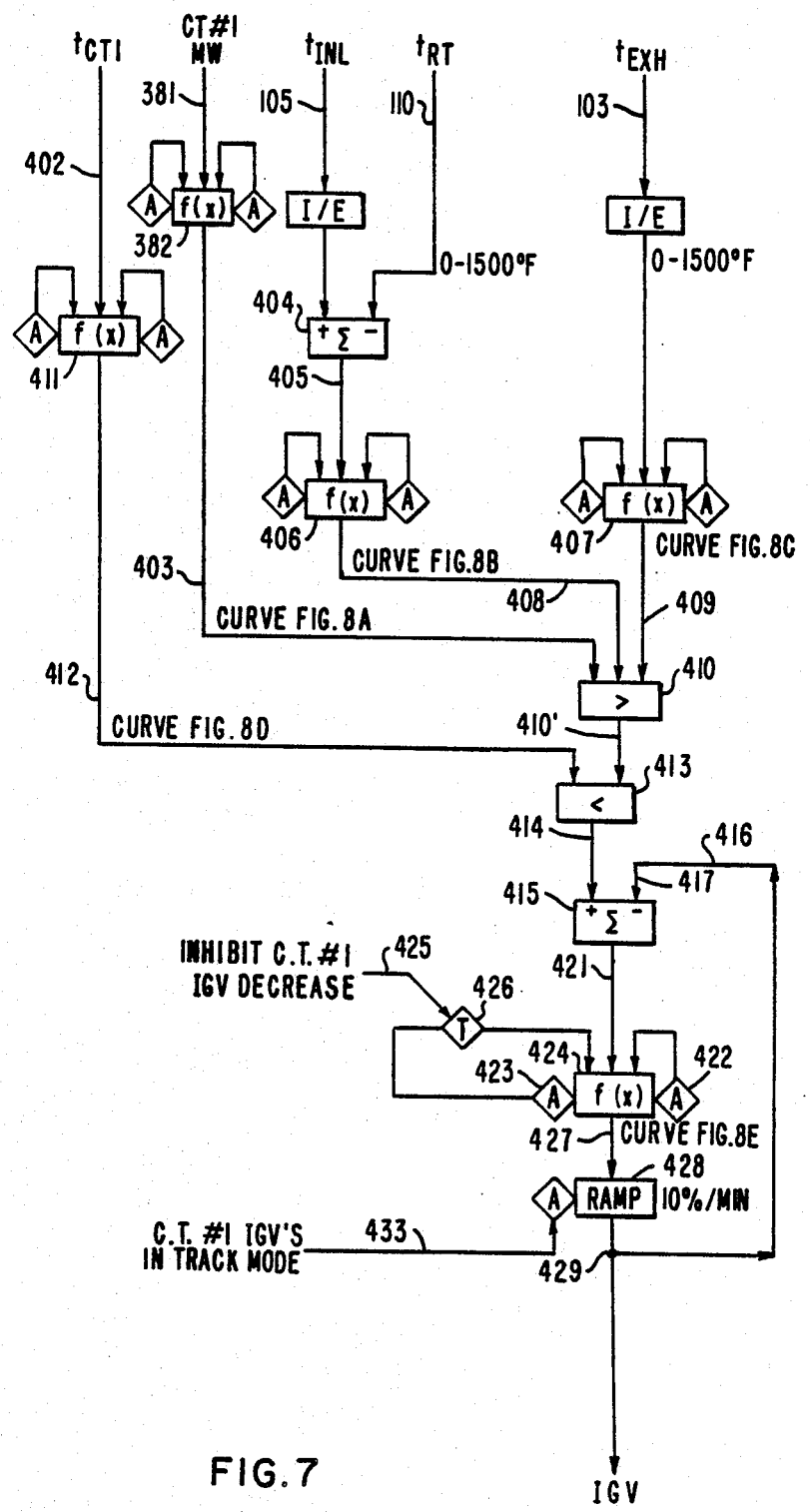
FIG. 7 shows in block diagram circuitry for the improved inlet guide vane positioning controller for the gas turbine, in accordance with the present invention.
Figure 8A:
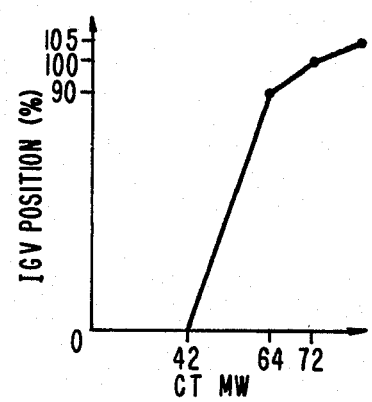
FIGS. 8A–8E are curves characterizing the respective function generators of the circuit of FIG. 7.
Figure 8B:
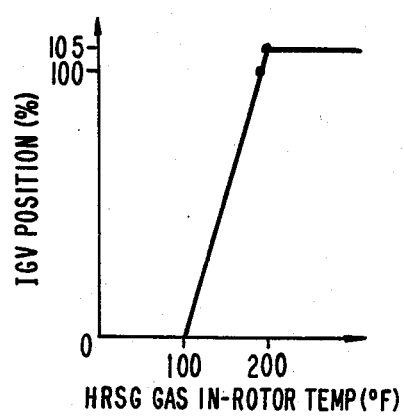
Figure 8C:
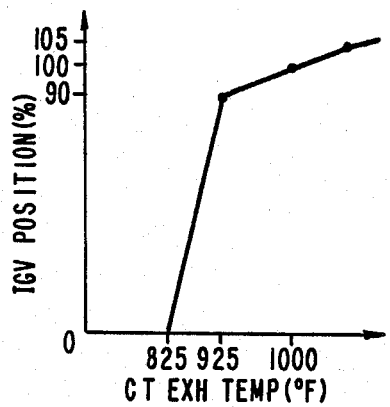
Figure 8D:
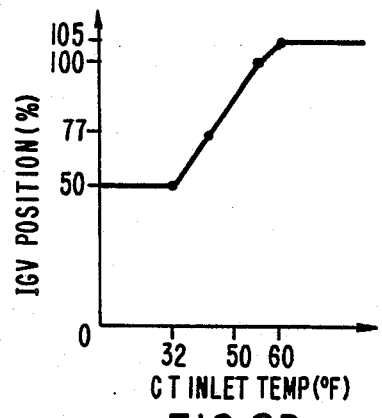

Referring to FIG. 7, inlet gas vane (IGV) control will now be described with particularity. The gas turbine IGV mechanism is used to control the temperature of the exhaust gasses from the gas turbine entering the afterburner by admitting through the gas turbine a controlled flow of air at atmospheric temperature. It will appear that, according to the present invention, the superheated steam temperature at the outlet of the HRSG can be held relatively constant while changing load on the gas turbine. More generally, as already mentioned by reference to FIG. 5C concurrent afterburner and attemperator control can also maintain such outlet temperature $t_{OUL}$ substantially constant. More generally, a combination of IGV, afterburner and attemperator control with the integrated system according to the present invention, permits achieving such constant superheated steam temperature over a wide load range, whereby, gas turbine operation can be made independent of the steam turbine temperature requirements. Control of the inlet gas vanes (IGV's) for the particular combustion turbine is effected from line 431 in response to a plurality of signals derived on lines 412, 403, 408 and 409, respectively and applied as follows:

Temperature $t_{CTI}$ of the gas inlet of the combustion turbine is sensed and a representative signal is applied via line 402 to a function generator 411 having a characteristic curve such as shown by FIG. 8D. This curve expresses positioning of the vanes of the IGV in relation to the combustion turbine inlet temperature where, typically, below 32° F. the IGV position will not be less than 50% and above 55° F. it will go as far as 105% open, in accordance with the manufacturer's requirements for an effective use of the IGV's. The controlling signal at the output of function generator 411 is applied via line 412 to one input of a low select circuit 413.

The output in megawatts of the combustion turbine is measured and the representative signal derived on line 381 is applied to a function generator 382 having a response characteristic curve as shown by FIG. 8A. This curve expresses the IGV positioning in relation to the megawatts. The relationship is proportional, namely from 0% to 90% when the load varies from 42 MW to 54 MW. Between 64 MW and 80 MW, IGV positioning tapers off as shown for the range 90% to 105%. The control signal so derived appears on line 403 and is applied as one input to a high select circuit 410.

The inlet temperature $t_{INL}$ of the heat recovery steam generator derived on line 105, is compared with the steam turbine rotor temperature $t_{RT}$ derived on line 110. They both may vary from 0° F. to 1500° F. The difference measured by subtractor 404 is applied, via line 405, to a function generator 406 having an IGV positioning characteristic as a function of such difference as shown by the curve of FIG. 8B. If the difference between lines 105 and 110 is smaller than 100° F., the IGV is not controlled and remains closed. If the error on line 405 is larger than 100° F., a linearly derived control signal of magnitude representing zero to 105% is derived on line 408 for a range of temperatures going from 100° to 200° F. Beyond 200° F., the IGV stays at its maximum opening position.

The temperature $t_{EX}$ at the exhaust of the combustion turbine is derived on line 103 and applied to a function generator 407 having a characteristic curve such as shown by FIG. 8C. Thus, the IGV is positioned proportionally open from zero to 90% when $t_{EX}$ vary from 825° F. to 925° F. Beyond 925° F., the degree of control varies from 90% to 105%. Function generator 407 outputs a control signal on line 409 inputted to the high select circuit 410. Therefore, the larger of the signals inputted on lines 403, 408 and 409 becomes dominant as a control signal on line 410', whereas, the lower of the signals of lines 412 and 410' will appear on line 414 at the output of the low select circuit 413.

Figure 8E:
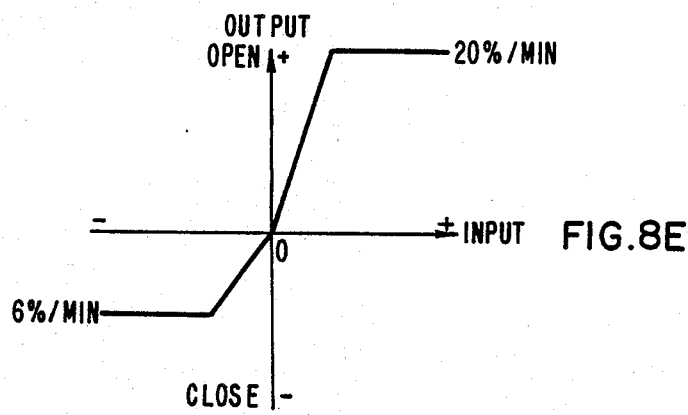

The signal of line 414 goes, via a subtractor circuit 415, also responsive by line 417 to the IGV positioning feedback signal of line 416. Output line 421 goes to a function generator 424 having a characteristic such as shown by FIG. 8E. Thus, the IGV is to be opened linearly at a rate from zero to 20%/min. when the input signal on line 421 is positive (the upper limit is defined by the limit set on line 422) whereas, the rate of closing for the IGV is linear on the way down until 6%/min., when the input on line 421 is negative (the lower limit being defined by line 423). A switch 426 is inserted in line 423 which is controlled by line 425 whenever decrease operation is required to be inhibited. The output from function generator 424 appears on line 427. It is applied to a ramp 428, typically of 10%/minute. The output from the ramp on line 429 is applied through a two-position switch 430 used in the other position for manual control, if necessary. By line 431 (and line 101 of FIG. 4) the resulting command signal is applied to the IGV control system per se.

Figure 9:
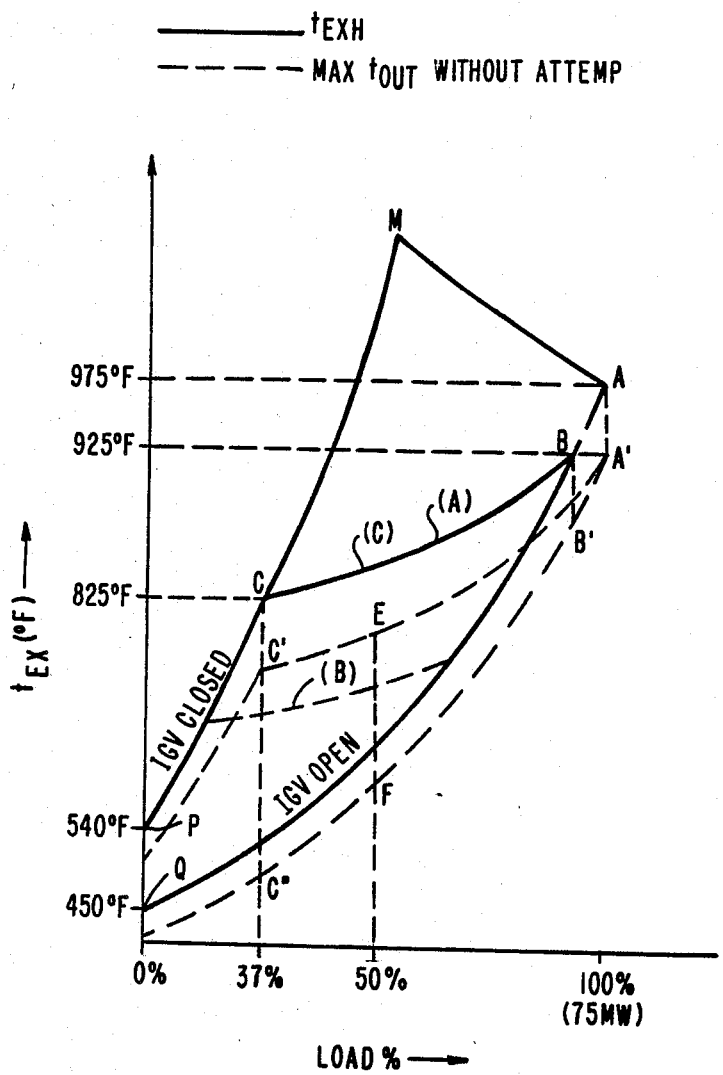
FIG. 9 illustrates with curves IGV modulation concurrent wigh gas turbine load changes and the effect on the exhaust temperature of the gas turbine.

Reference should be had now to FIG. 9 showing curves which explain how IGV modulation allows control of the combustion turbine without substantially affecting the superheated steam output temperature $t_{OUL}$ governed by the steam turbine operation.

The exhaust temperature from the combustion turbine is shown in ordinate (solid line) as a function of the load of the combustion turbine typically between 0% and 100% (75 MW). When the IGV's are open, the temperature characteristic follows curve QBA as the load goes from 0% to 100% megawatts. The maximum $t_{EX}$ temperature at point A typically is 975° F. With the IGV's closed, however, the curve followed is along PCM. The effective load is limited to 50% when the temperature goes as high as 1000° F., typically, at point M. Temperatures above the ordinate of A are not to be reached. In dotted lines are represented the maximum capability temperatures which are effective on the boiler without attemperation, thus shifted downward by about 50° F. Reducing firing of the combustion turbine from 100% at point A so as to bring the temperature at the desired level of about 925° F., thus along AB, is effected with the IGV open. This leads to the operational temperature A' as used by the steam turbine. If from such normal level of operation there is a need to further reduce the load, it appears that the temperature gradient along curve BQ is excessive. In contrast, when the load reduction is effected concurrently with a progressive closing of the IGV's, the curve followed will be BC as shown, thus with an acceptable temperature gradient. The same can be said when the load is to be increased, the IGV's initially closed, being open gradually, from C to B. The characteristics of FIGS. 8A and 8C determine the characteristic BC. At startup, or restart, e.g. when the boiler is cold and the steam turbine still warm, or the boiler is hot and the steam turbine cold, the characteristic of the curve of FIG. 8B determines operation of the IGV along the dotted line EF. Thus, a minimum gas inlet temperature is maintained at low load as shown by points E and F.

Under the same circumstances, if the rotor of the steam turbine is at 700° F. the IGV is closed at zero attemperation as shown by operative point P on FIG. 5C, and the IGV is controlled to be fully open at the operative point Q, thereby to hold the gas inlet temperature between 780° and 900° F. while the attemperator keeps the output temperature $t_{OUL}$ at 700° F. If the curves of FIG. 5C and those of FIG. 9 are considered together, it appears that modulation of the afterburner A/B and of the attemperator, followed by modulation of the IGV's will permit a wide range of control downward of the combustion turbine load, and conversely when increasing the load, without substantially modifying the operative temperature on the steam turbine side of the system. First, as shown along AB in FIG. 5C, combined action of the afterburner reduced firing and modulation of the attemperator, allows to maintain the temperature at the outlet around say 952° F., thereby avoiding excessive temperature (shaded triangular area). At that level, the load of the combustion turbine can be as shown by point B at 90% with the IGV open. The attemperator being at the end of its modulation range (point B in FIG. 5C), the IGV is modulated from B to C (FIG. 9A) while reducing the combustion turbine load with a minimum change in the inlet of steam to the steam turbine. The same can be said in the opposite direction of load control on the combustion turbine.

The interaction of the IGV, the afterburner and the attemperator with combustion turbine load adjustments according to the present invention can be summarized as follows:

The gas turbine IGV's are used to control the exhaust gas temperature entering the afterburner. Constant steam temperature over a large portion of the load range is achieved by a combination of IGV, afterburner an attemperator control. Therefore, gas turbine operation can become independent of steam turbine temperature requirements.

When the gas turbines are at low loads, then, the IGV's are modulated to maintain minimum HRSG inlet temperature. This results in the ability to set the HRSG outlet temperature $t_{OUL}$ independently of combustion turbine load over most of the combustion turbine load range and whether, or not, the afterburners are being fired to maintain the boiler inlet gas temperature above such minimum HRSG inlet temperature. This makes it possible to set the HRSG steam outlet temperature.

Optimum efficiency is obtained by using minimum desuperheater/attemperator water at the superheater to maintain temperature. This is accomplished by:

(A) Combustion turbine inlet guide vanes control to raise the turbine exhaust temperature, but not above the minimum required for the desired steam temperature.

(B) Afterburner firing control to improve steam flow, but preferably reducing afterburner firing to lower steam temperature by adding desuperheating/attemperator water.

Wide load range combustion turbine operation is achieved by:

(A) Combustion turbine inlet guide vanes control to minimize exhaust temperature variations with change of load.

(B) Afterburner control to maintain the boiler gas inlet temperature and inlet temperature rate of change.

(C) Desuperheater/attemperator control for the superheated steam to control the boiler outlet steam temperature and steam temperature rate of change.

It is generally known to modulate the position of the inlet guide vanes as a function of load or inlet blade path temperature. See for instance, U.S. Pat. No. 3,973,391 (Reed and Smith) which is incorporated by reference. In contrast, with the present invention the inlet guide vanes are used to control temperature of the exhaust gas entering the afterburner, and, when the gas turbine is at low loads, the IGV's are modulated so as to maintain a minimum inlet temperature $t_{INL}$ for the heat recovery steam generator. This results in making the HRSG outlet temperature $t_{OUL}$ independent of the combustion turbine load over most of its load range, whether, or not, firing the afterburners is being controlled to maintain the boiler inlet gas temperature above the said minimum HRSG inlet temperature. This also enables setting independently the superheated steam outlet temperature $t_{OUL}$. In addition, the circuitry of FIG. 7 operates concurrently with the circuitry of FIGS. 5A, 5B and 6A, 6B, so that constant steam temperature $t_{OUL}$ is achieved over a large portion of the load range, namely through combined control of the IGV, the afterburner and the attemperator.

Steam turbine operation, either in a following mode, or under control of the plant master unit (PUM) controller, will establish a throttle steam temperature setpoint, for instance under the requirement of an enthalpy controller demanding steam at certain conditions of temperature, pressure and steam flow for the admission to the steam turbine. Nevertheless, it is desirable to operate on the steam generating side the combined cycle power plant so as to run the heat recovery steam generator system under optimum efficiency. Accordingly, the present invention provides control of three selected independent variables, through, namely, control of the inlet guide vanes of the gas turbine, controlled firing of the afterburner and control of the attemperator associated with the superheater of the boiler, so as to achieve such optimum efficiency.

The inlet guide vanes of the gas turbine are controlling the inlet temperature $t_{INL}$ of the hot gas going into the boiler beyond the afterburner. Such temperature is normally typically 200° F. larger than the temperature $t_{RT}$ of the rotor. If the difference appears to be less than 100° F., as shown by the curve of FIG. 8B, the IGV will be allowed to stay closed. If the difference is by more than 100° but less than 200° F., the IGV will be partially open to the same extent, and it will remain wide open above 200° F. difference. If there is cold steam, the IGV will open early. The vanes will stay closed when there is hot steam, thereby relying on the attemperator in all its capability within a range to keep the steam temperature where it should be. It appears that the IGV control mode, according to the aspect of the invention, is based on the level of $t_{INL}$ but by reference to rotor temperature $t_{RT}$. The IGV will operate so as to maintain $t_{RT}$ above $t_{INL}$ but not too much above it. In this way, the gas turbine will be most effective on a cold day in keeping the steam pressure down.

A comparison of curves 8A and 8C will show that these effects on IGV positioning may be redundant or different. The concurrent presence of these two means insures that the IGV goes full open if either the demand in megawatts rises, or the exhaust temperature $t_{EXH}$ goes under full gas turbine loading.

If an exhaust temperature of 1345° F. is reached, the gas turbine will have reached its limit, and the afterburner can be used. If, however, the gas turbine has not reached such limit, it is advisable to inhibit firing the afterburner and first to increase firing of the gas turbine. On the other hand, when going down, if the gas turbine is at its limit, it is advisable to first decrease the afterburner, then the gas turbine. For this reason, as shown in FIG. 7, an "inhibit of gas turbine firing decrease" command is provided at 425, which by switch 426 prevents function generator 424 from introducing a decreasing rate on the ramp 428.

We claim:

1. In a command cycle electrical power plant including: a steam turbine and at least one set comprising a gas turbine, an afterburner and a heat recovery steam generator having an attemperator for supplying from an outlet thereof to said steam turbine superheated steam under steam turbine operating conditions requiring predetermined superheated steam temperature, flow and pressure; with said gas turbine and steam turbine each generating megawatts in accordance with a plant load demand; master control means being provided for controlling said steam turbine and said heat recovery steam generator so as to establish said steam operating conditions; the combination of:

first control means responsive to the gas inlet temperature of said heat recovery steam generator and to the plant load demand for controlling the firing of said afterburner;

second control means responsive to said superheated steam predetermined temperature and to superheated steam temperature from said outlet for controlling the attemperator between a closed and an open position;

said first and second control means being operated concurrently to maintain said superheated steam outlet temperature while controlling the load of said gas turbine independently of said steam turbine operating conditions.

2. The power plant of claim 1 with said gas turbine having inlet guide vanes (IGV's) operable between an open and a closed position and means for concurrently controlling said IGV's in response to the load of said gas turbine for changing the inlet temperature of gasses to said heat recovery steam generator, thereby to minimize changes on said operating conditions of said steam turbine.

3. The power plant of claim 2 with said IGV's controlling means including: a first function generator responsive to a signal representative of the gas turbine load demand for generating a first setpoint signal representative of IGV positions within a predetermined range of said gas turbine load demand; a second function generator responsive to a signal representative of the difference between said gas inlet temperature of said heat recovery steam generator plant and the steam turbine rotor temperature for generating a second IGV position setpoint signal; and a third function generator responsive to a signal representative of the gas exhaust temperature into said afterburner for generating a third IGV position setpoint signal;

the highest signal in magnitude of said first, second and third IGV position setpoint signals being used to control said IGV's in position.

4. The plant of claim 3 with said first, second and third IGV position setpoint signals being operative linearly in a range extending from the closed position to a small fraction away from fully open position.

5. The plant of claim 4 with said IGV controlling means further including a fourth function generator responsive to the gas inlet temperature of said gas turbine for generating a fourth IGV position setpoint signal, said fourth IGV position setpoint signal being operative in magnitude in a range corresponding to between partially open and fully open IGV; the lowest signal in magnitude between said highest signal and said fourth IGV position setpoint signal being used to control said IGV's in position.

6. The plant of claim 5 with ramping means responsive to said lowest signal for applying ramp signal at a selected rate of change to move said IGV's into position.

7. The plant of claim 6 with feedback loop means for deriving a ramp feedback signal from said ramping means, the difference between said position feedback signal and said ramp feedback signal being used to move said IGV's into position.

8. The plant of claim 7 with said first control means being responsive to a plant load demand error representative signal generating an afterburner ramping setpoint signal for said afterburner in accordance with an afterburner ramping function and in relation to said load demand error representative signal; with controller means being provided responsive to the gas inlet temperature of said heat recovery steam generator and to said afterburner ramping setpoint signal for applying an afterburner control signal to said afterburner.

9. The plant of claim 8 with said afterburner controller means being operative concurrently with a signal which is the derivative of said afterburner ramping setpoint signal.

10. The plant of claim 9 with said afterburner control signal being applied at a rate which is substantially larger toward the open position than toward the closed position.

11. The plant of claim 10 with the plant including at least two of said sets of a gas turbine, an afterburner and a heat recovery steam generator having an attemperator, said steam turbine operating conditions involving predetermined superheated steam temperature, flow and pressure for mixed superheated steam from said sets, with said second control means including (a) an attemperator controller responsive to said predetermined temperature in relation to mixed superheated steam and to a targeted predetermined temperature, and (b) an attemperator ramp generator responsive to said attemperator controller for generating an attemperator ramping setpoint signal to position said attemperator between open and closed positions.

12. The plant of claim 11 with said attemperator controller being responsive to the outlet temperature of the attemperator of said one set, means being provided for giving priority upon said attemperator controller to the lower between said mixed steam predetermined temperature and said outlet temperature.

13. The plant of claim 11 with said second control means further including limiter means responsive to gas inlet temperature of the heat recovery steam generator of said one set for establishing a limited gas inlet temperature thereof, a comparator being provided responsive to the outlet temperature of the attemperator of said one set and to said limited gas inlet temperature for establishing a temperature error, and an override controller being provided responsive to said temperature error for generating an overriding command signal operative upon said attemperator controller to match the gas inlet temperature with the superheated steam outlet temperature.

14. The plant of claim 12 with means responsive to the difference between the steam turbine rotor temperature and said mixed superheated steam predetermined temperature exceeding predetermined amount for modifying the ramping rate of said attemperator setpoint signal.

15. The plant of claim 12 with means responsive to the difference between the superheated steam outlet temperature and said superheated steam predetermined temperature exceeding a predetermined amount for modifying the ramping rate of said attemperator setpoint.

* * * * *